(12) United States Patent
Digmann et al.

(10) Patent No.: US 8,495,838 B2
(45) Date of Patent: Jul. 30, 2013

(54) SIDE SEAL MEMBERS FOR A DOCK SEAL

(75) Inventors: Charles J. Digmann, Dubuque, IA (US); Timothy J. Schmidt, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 13/231,455

(22) Filed: Sep. 13, 2011

(65) Prior Publication Data
US 2012/0000150 A1 Jan. 5, 2012

Related U.S. Application Data

(63) Continuation of application No. 12/128,443, filed on May 28, 2008, now Pat. No. 8,141,305.

(51) Int. Cl.
*E04H 14/00* (2006.01)
(52) U.S. Cl.
USPC ............ 52/173.2; 52/DIG. 13; 277/650; 49/475.1
(58) Field of Classification Search
USPC ............ 52/173.2, 212, DIG. 13; 428/68, 428/71; 49/460, 475.1; 293/120, 109, 142; 267/139, 140; 5/643, 490, 653, 922
See application file for complete search history.

(56) References Cited

U.S. PATENT DOCUMENTS

| | | | |
|---|---|---|---|
| 2,606,755 A * | 8/1952 | Samuels | 267/140 |
| 3,181,205 A | 5/1965 | Frommelt et al. | |
| 3,230,675 A | 1/1966 | Frommelt et al. | |
| 3,286,417 A | 11/1966 | Dazzo | |
| 3,322,132 A | 5/1967 | Rieder et al. | |
| 3,472,546 A * | 10/1969 | Samuels | 293/128 |
| 3,690,710 A | 9/1972 | Curran | |
| 3,712,003 A * | 1/1973 | Hallock et al. | 52/254 |
| 3,939,614 A | 2/1976 | Frommelt et al. | |
| 4,015,380 A | 4/1977 | Chalfant | |
| 4,084,348 A * | 4/1978 | Hast | 49/475.1 |
| 4,161,567 A | 7/1979 | Sturgeon | |
| 4,168,554 A * | 9/1979 | Hindes | 5/722 |

(Continued)

FOREIGN PATENT DOCUMENTS

| | | |
|---|---|---|
| WO | 0027734 | 5/2000 |
| WO | 0078653 | 12/2000 |
| WO | 200407410 | 9/2004 |

OTHER PUBLICATIONS

International Bureau, "International Preliminary Report on Patentability," issued in connection with international application serial No. PCT/US2009/042572, issued Nov. 30, 2010, 7 pages.

(Continued)

*Primary Examiner* — Robert Canfield
*Assistant Examiner* — Matthew Gitlin
(74) *Attorney, Agent, or Firm* — Hanley, Flight & Zimmerman, LLC

(57) ABSTRACT

Side seal member for a loading dock seal are disclosed. An example dock seal includes a backer to couple the dock seal to a wall and a resiliently compressible member supported by the backer. A pliable cover encases the compressible member. The pliable cover has a first end overlapping a second end to define a separable joint that is to be disposed between the backer and the wall when the dock seal is coupled to the wall.

20 Claims, 6 Drawing Sheets

U.S. PATENT DOCUMENTS

| | | | |
|---|---|---|---|
| 4,724,648 A | | 2/1988 | Diepholder |
| 4,780,921 A | * | 11/1988 | Lahn et al. .................. 5/630 |
| 4,799,341 A | * | 1/1989 | Frommelt et al. ........... 52/173.2 |
| 4,799,342 A | * | 1/1989 | Klevnjans .................... 52/173.2 |
| 4,862,539 A | * | 9/1989 | Bokich .............................. 5/691 |
| 4,867,135 A | * | 9/1989 | Stecker ........................ 126/500 |
| 4,873,800 A | | 10/1989 | Frommelt et al. |
| 4,914,763 A | * | 4/1990 | Clark ................................. 5/643 |
| 4,963,408 A | * | 10/1990 | Huegli ............................ 428/71 |
| 5,122,398 A | | 6/1992 | Seiler et al. |
| 5,125,196 A | | 6/1992 | Moody |
| 5,333,424 A | | 8/1994 | Chalfant et al. |
| 5,442,825 A | * | 8/1995 | Hahn et al. ..................... 14/71.1 |
| 5,508,078 A | * | 4/1996 | Stalnaker ........................ 428/71 |
| 5,511,445 A | * | 4/1996 | Hildebrandt ................. 74/558.5 |
| 5,592,901 A | * | 1/1997 | Birmingham ................ 119/706 |
| 5,658,633 A | | 8/1997 | Di Biase |
| 5,779,318 A | * | 7/1998 | O'Reilly .................. 297/452.55 |
| 6,014,782 A | * | 1/2000 | Stevenson ......................... 5/499 |
| 6,014,844 A | | 1/2000 | Thill |
| 6,110,312 A | | 8/2000 | Arnold et al. |
| 6,120,871 A | | 9/2000 | De Biase |
| 6,170,205 B1 | * | 1/2001 | Styba ........................... 52/173.2 |
| 6,216,292 B1 | * | 4/2001 | Oakhill et al. ..................... 5/482 |
| 6,272,799 B1 | | 8/2001 | Ashelin et al. |
| 6,311,435 B1 | * | 11/2001 | Brockman et al. ........... 52/173.2 |
| 6,854,224 B2 | | 2/2005 | Thill et al. |
| 7,246,467 B1 | | 7/2007 | Miller et al. |
| 7,287,353 B2 | | 10/2007 | Thill et al. |
| 7,383,664 B2 | | 6/2008 | Chalfant |
| 7,886,737 B2 | * | 2/2011 | McConnell et al. .......... 126/544 |
| 2002/0112418 A1 | | 8/2002 | Thill et al. |
| 2002/0129845 A1 | * | 9/2002 | Silverstein ...................... 135/71 |
| 2003/0177720 A1 | | 9/2003 | Hoffmann et al. |
| 2004/0123532 A1 | | 7/2004 | Thill et al. |
| 2005/0108961 A1 | | 5/2005 | Chalfant |
| 2006/0272222 A1 | | 12/2006 | Hoffmann et al. |
| 2007/0151819 A1 | | 7/2007 | Schmidt et al. |
| 2007/0152390 A1 | | 7/2007 | DiBiase |
| 2008/0047211 A1 | * | 2/2008 | Hoffmann et al. ........... 52/309.9 |
| 2009/0293382 A1 | | 12/2009 | Digmann et al. |

OTHER PUBLICATIONS

International Searching Authority, "International Search Report," issued in connection with international application serial No. PCT/US2009/042572, mailed Jul. 16, 2009, 5 pages.

International Searching Authority, "Written Opinion of the International Searching Authority," issued in connection with international application serial No. PCT/US2009/042572, mailed Jul. 16, 2009, 6 pages.

United States Patent and Trademark Office, "Notice of Allowance," issued in connection with U.S. Appl. No. 12/128,443, issued May 16, 2011, 20 pages.

United States Patent and Trademark Office, "Non-Final Office Action," issued in connection with U.S. Appl. No. 12/128,443, issued Sep. 17, 2010, 26 pages.

United States Patent and Trademark Office, "Notice of Allowance," issued in connection with U.S. Appl. No. 12/128,443, mailed Nov. 16, 2011, 8 pages.

United States Patent and Trademark Office, "Corrected Notice of Allowance," issued in connection with U.S. Appl. No. 12/128,443, mailed Dec. 15, 2011, 8 pages.

* cited by examiner

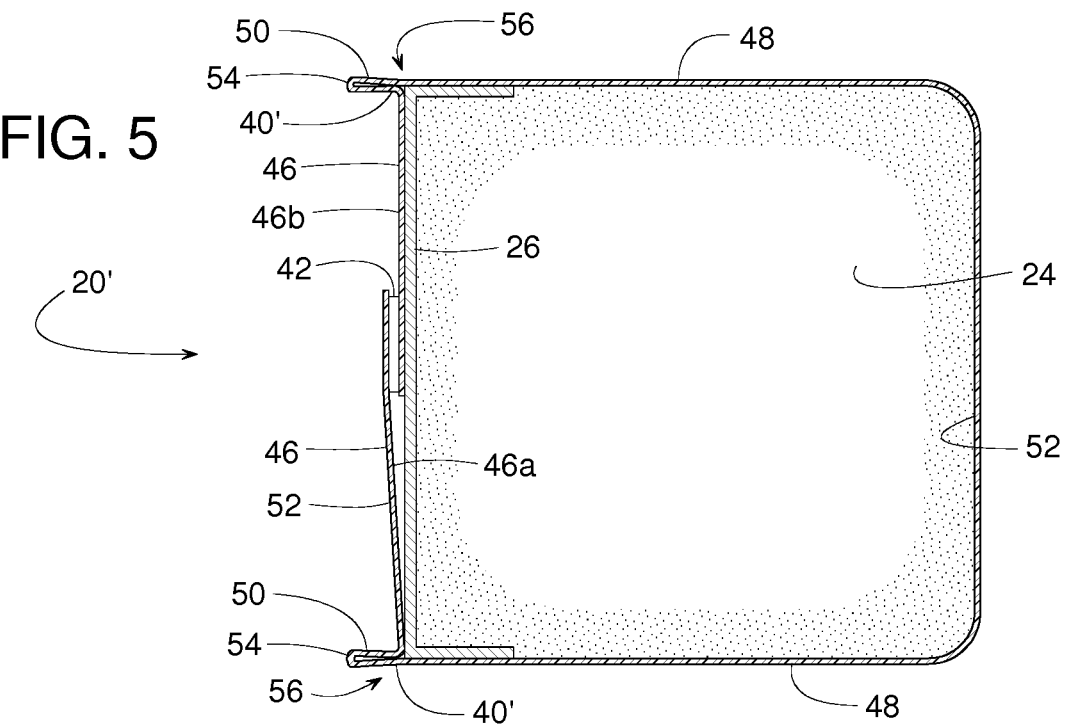
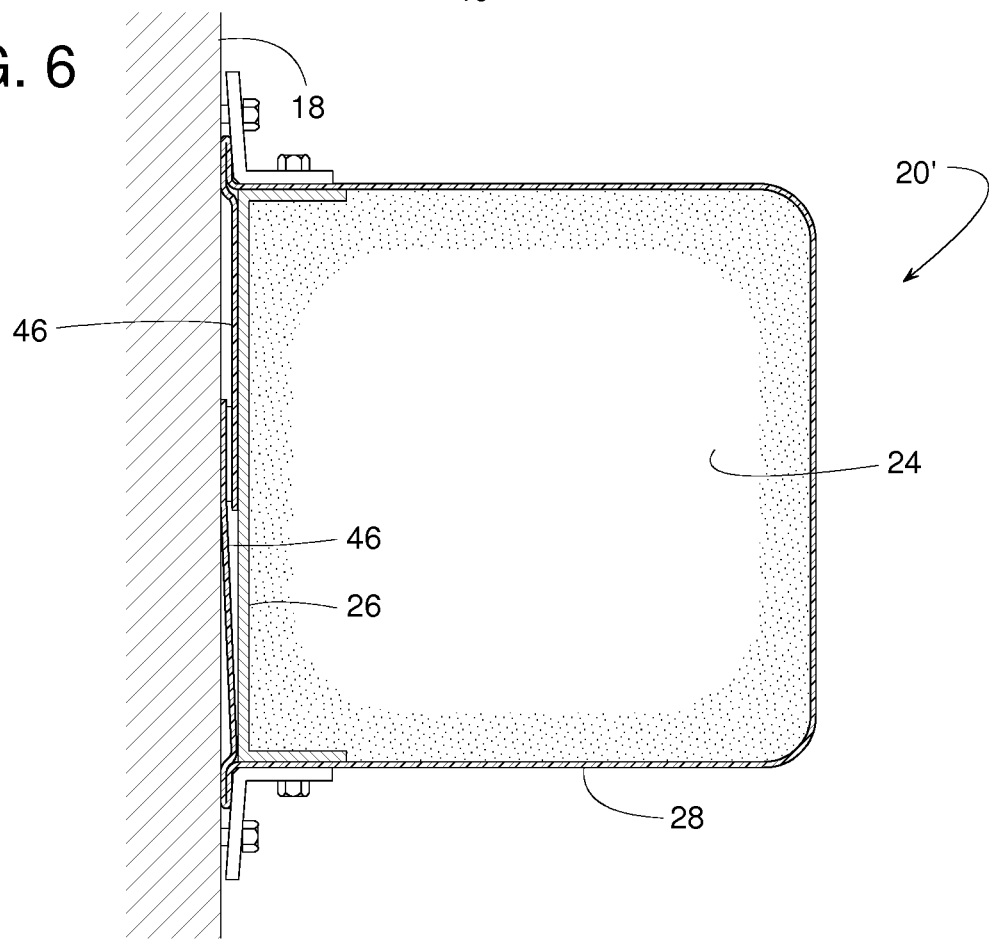

SIDE SEAL MEMBERS FOR A DOCK SEAL

CROSS REFERENCE TO RELATED APPLICATION

This patent arises as a continuation of U.S. patent application Ser. No. 12/128,443, filed May 28, 2008, entitled "Side Seal Members for a Dock Seal," which is incorporated herein by reference in its entirety.

FIELD OF THE DISCLOSURE

The subject disclosure generally pertains to loading dock seals and, more specifically, to side seal members for a dock seal.

BACKGROUND

When an exterior doorway of a building is used as a loading dock for vehicles, such as trucks and tractor/trailers, the perimeter of the doorway often includes a dock seal. Dock seals close off air gaps that would otherwise exist between the exterior face of the building and the back end of the trailer. Sealing the air gaps allows cargo from the rear of the trailer to be loaded or unloaded while dockworkers and the cargo are protected from the weather and other elements.

To seal the rear vertical edges of the vehicle, dock seals typically include two side seals running vertically along the lateral edges of the doorway. A top seal, header, or curtain extending horizontally across the doorway's upper edge is often used for sealing the vehicle's upper rear edge.

Although the actual construction of dock seals may vary, typically, side seals comprise a resiliently compressible foam core supported by a rigid backer, such as a wood plank. The foam core and backer are normally encased within a protective cover made of fabric or some other pliable material. Sealing is provided by backing the trailer up against the seal so that the seal compressively conforms to the rear shape of the trailer. The foam core provides the necessary compliance and resilience to repeatedly conform to the shape of various trailers; the outer cover protects the foam core from dirt, water and wear; and the backer provides solid structure for mounting the seal to the wall and for supporting the foam core so that the foam core does not twist and roll within the cover.

Although the compressible foam core usually seals quite well against the rear edges of the vehicle, the relatively rigid backer might not always seal so tightly against a wall having an irregular surface, such as a brick surface. Thus, air gaps might exist between the wall and the backside of the side seal. Such gaps might be sealed using caulk; however, a substantial amount of caulk might be needed for large gaps. An excessive amount of caulk can create a messy appearance, and the caulk can crack or tear when the side seal deflects under compressive pressure from a vehicle.

BRIEF DESCRIPTION OF THE DRAWINGS

FIG. 5 is a cross-sectional view similar to FIG. 3 but showing another example dock seal described herein.

FIG. 6 is a cross-sectional view similar to FIG. 4 but showing the example side seal of FIG. 5.

DETAILED DESCRIPTION

Figure 1:
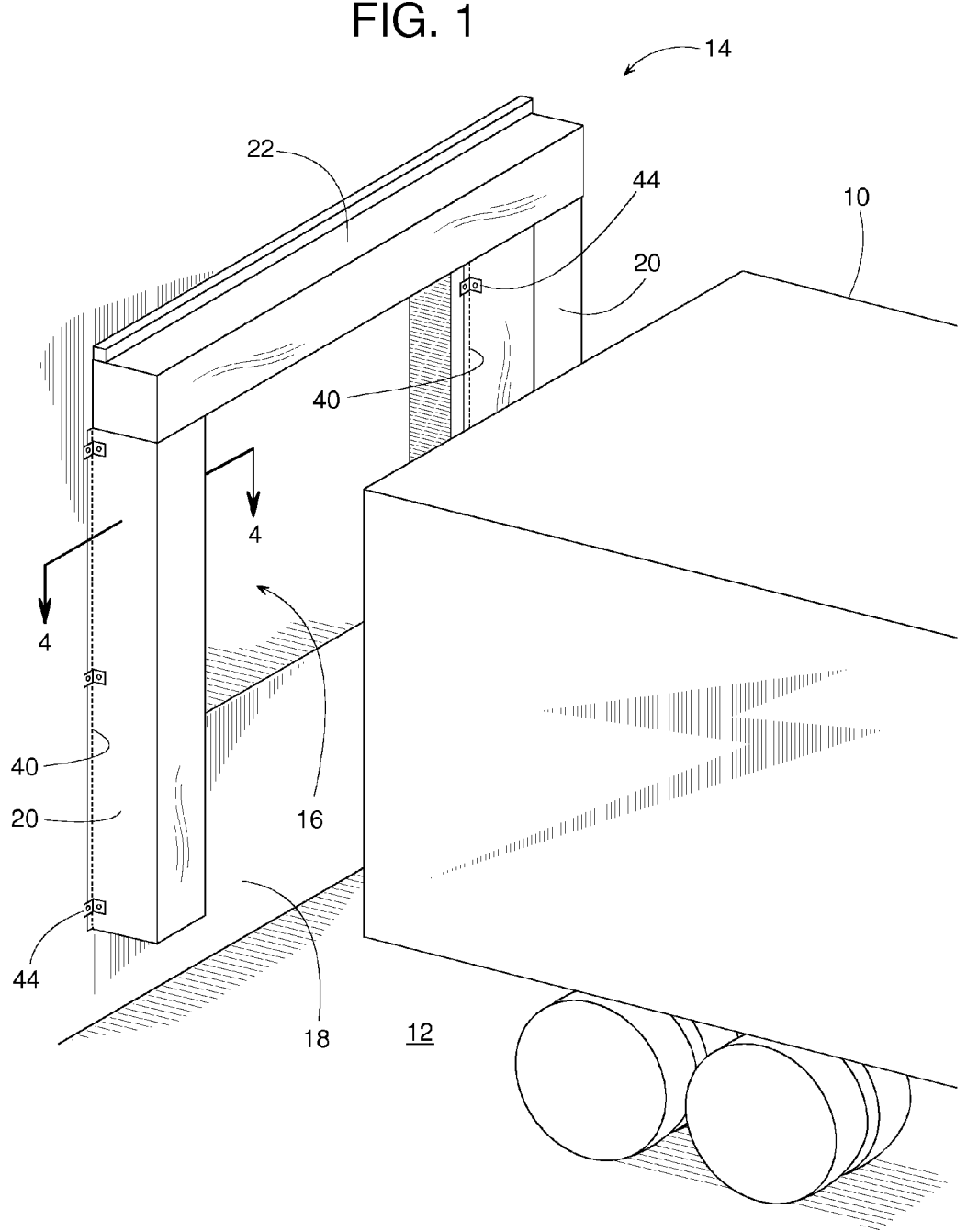
FIG. 1 is a perspective view of an example dock seal that is about to be engaged by a vehicle.
Figure 2:
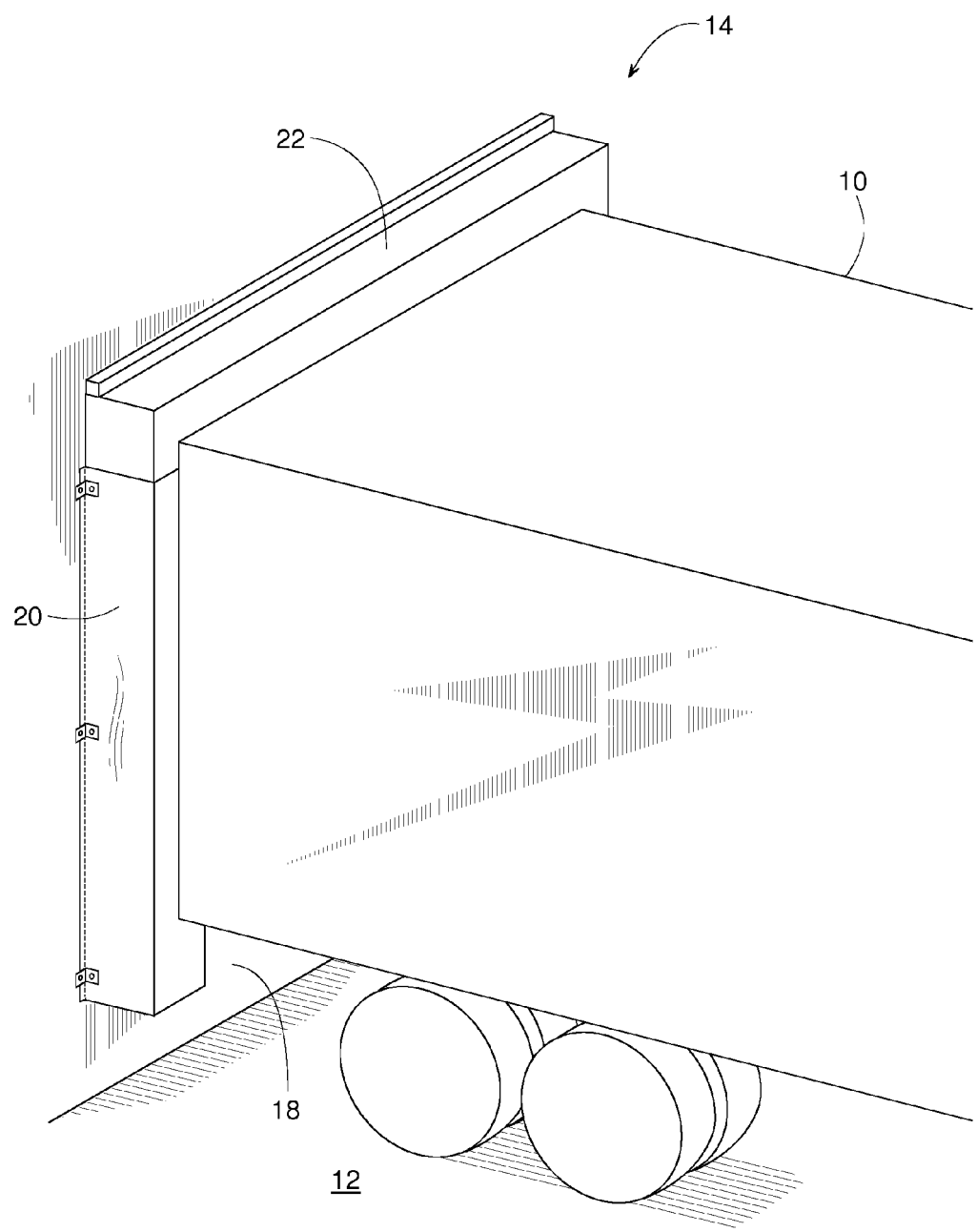
FIG. 2 is a perspective view of the example dock seal of FIG. 1 having a vehicle engaged with the example dock seal of FIG. 1.

FIG. 1 shows a vehicle 10, such as a trailer of a truck, backing into a loading dock 12 that includes a dock seal 14, and FIG. 2 shows vehicle 10 parked at its loading/unloading position and engaged with the dock seal 14. Loading dock 12 is basically a doorway 16 or an opening in a wall 18 of a building for loading and unloading of the vehicle's cargo through a rear access opening of the vehicle.

To provide a barrier to weather as vehicle 10 is being serviced at the doorway, dock seal 14 is mounted to wall 18 around doorway 16. Dock seal 14 helps seal the gaps between wall 18 and the rear edges of vehicle 10. Dock seal 14 includes two resiliently compressible side seals 20 for sealing against the vehicle's lateral rear edges and an upper seal 22 or curtain for sealing along the vehicle's upper rear edge.

Figure 3:
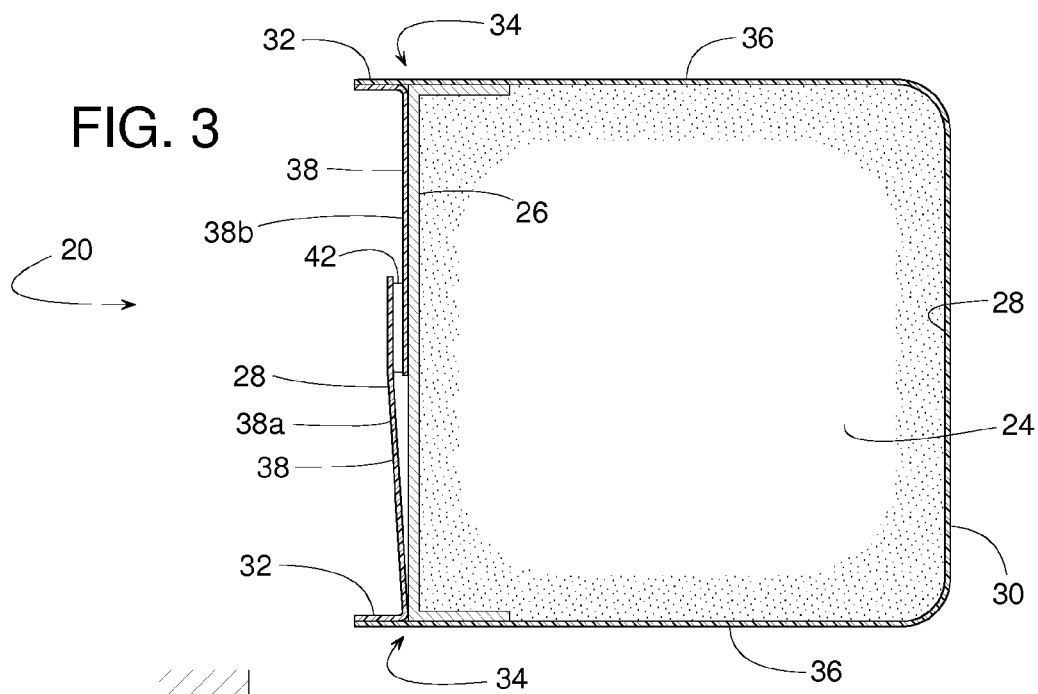
FIG. 3 is a cross-sectional view similar to FIG. 4 but showing the side seal prior to it being mounted to a wall.
Figure 4:
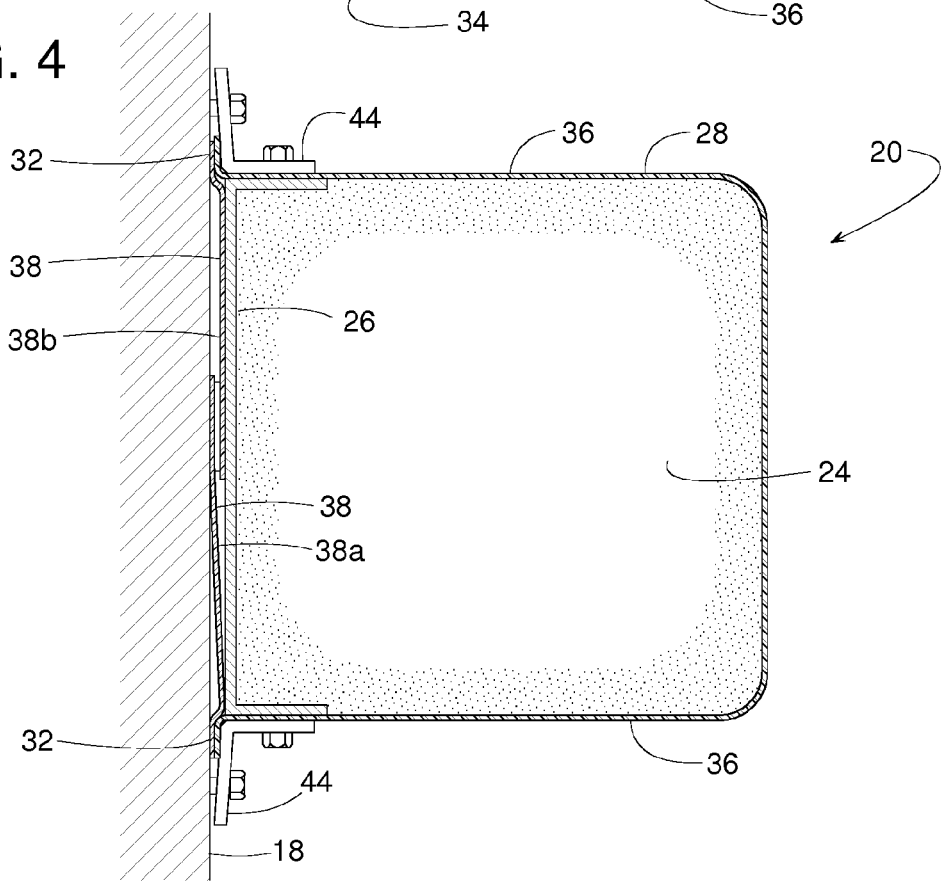
FIG. 4 is a cross-sectional view taken along line 4-4 of FIG. 1.

Referring to FIGS. 3 and 4, the basic construction of side seals 20 can comprise a resiliently compressible member 24 supported by a relatively rigid backer 26 such as, for example a wood plank or a piece of formed sheet metal. Compressible member 24 can be made of foam or a mechanically resilient structure. Compressible member 24 and backer 26 are preferably encased within a protective cover 28 made of fabric or some other pliable material. Sealing against weather is accomplished by vehicle 10 backing up against seal 20 so that seal 20 compressively conforms to the shape of the vehicle's rear edges. In some examples, member 20 comprises resiliently compressible foam that provides the necessary compliance and resilience to repeatedly conform to the shape of various vehicles (e.g., vehicle 10). Outer cover 28 protects compressible member 24 from dirt, water, and other elements. A front sheet 30 of cover 28 helps protect compressible member 24 from wear. Backer 26 provides solid structure for mounting seal 20 to wall 18 and for supporting compressible member 24.

To ensure that side seal 20 is in intimate sealing contact with a possibly irregular surface of wall 18, side seal 20 includes one or more flexible protruding lips 32 at an interface 34 between a side sheet 36 and a back sheet 38 of cover 28. Lip 32 can be produced or formed by sewing side sheet 36 to back sheet 38 along interface 34, thus creating a thread seam 40 (FIG. 1). Other methods of joining sheets 36 and 38 include, but are not limited to, thermal welding, ultrasonic welding, adhesive bonding, etc. Upon mounting side seal 20 to wall 18, lips 32 compliantly deflect to conform to various irregularities in the surface of wall 18, thereby eliminating or at least reducing gaps (e.g., air gaps) that might otherwise exist between wall 18 and the backside of side seal 20.

After side seal 20 is mounted to wall 18, any remaining gaps, if any, might be sealed by applying a layer of caulk between lip 32 and wall 18. In this manner, much of the caulk can be hidden underneath lip 32.

To further seal gaps between side seal 20 and wall 18, back sheet 38 can be comprised of two distinct pieces 38a and 38b that are separably attached to each other via a touch-and-hold fastener 42 (e.g., a fabric hook-and-loop fastener such as VELCRO™). Overlapping pieces 38a and 38b and fastener 42 provide a bulging section that can compressively seal against wall 18 when side seal 20 is mounted to the wall. In some cases, touch-and-hold fastener 42 is omitted, and the bulging section for sealing is provided simply by two or more layers of material overlapping each other. A series of mounting brackets 44 can be used for fastening backer 26 to wall 18.

FIGS. 5 and 6 illustrate another example side seal 20' described herein. Although in FIGS. 3 and 4, side sheet 36 and back sheet 38 are distinct, independent pieces joined by a sewn seam 40, side seal 20' of FIGS. 5 and 6 includes a back sheet 46 that is an integral extension of a side sheet 48. For side seal 20', a flexible protruding lip 50, similar to lip 32, can be produced by folding and sewing a cover 52, as shown. The folding can create a gentle or tight crease 54 at a distal end of lip 50, and a thread seam 40' at a vertical corner 56 of cover 52 produces or forms lip 50. Touch-and-hold fastener 42 can be used for separably joining two ends 46a and 46b of back sheet 46.

Figure 7:
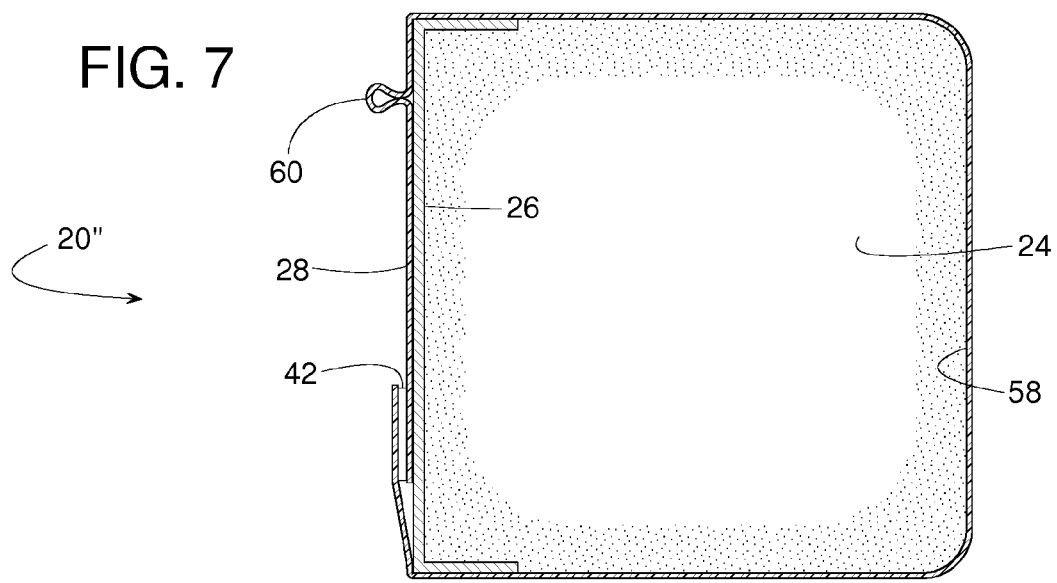
FIG. 7 is a cross-sectional view similar to FIGS. 3 and 5 but showing yet another example side seal described herein.
Figure 8:
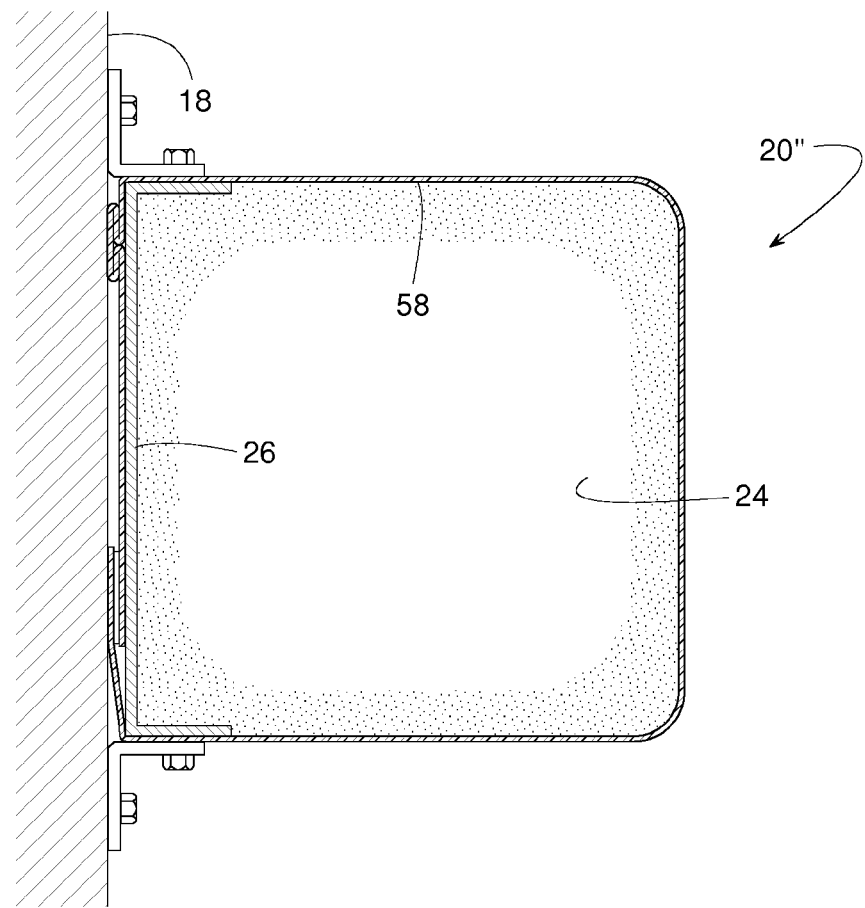
FIG. 8 is a cross-sectional view similar to FIGS. 4 and 6 but showing the side seal of FIG. 7.

FIGS. 7 and 8 illustrate yet another example side seal 20" described herein. As shown in FIGS. 7 and 8, a cover 58 includes one lip 60 that is produced in a manner similar to lips 50 of FIGS. 5 and 6. In this case, however, lip 60 is positioned so as to be compressed between wall 18 and backer 26 upon mounting side seal 20" wall 18. Touch-and-hold fastener 42 provides additional sealing.

Figure 9:
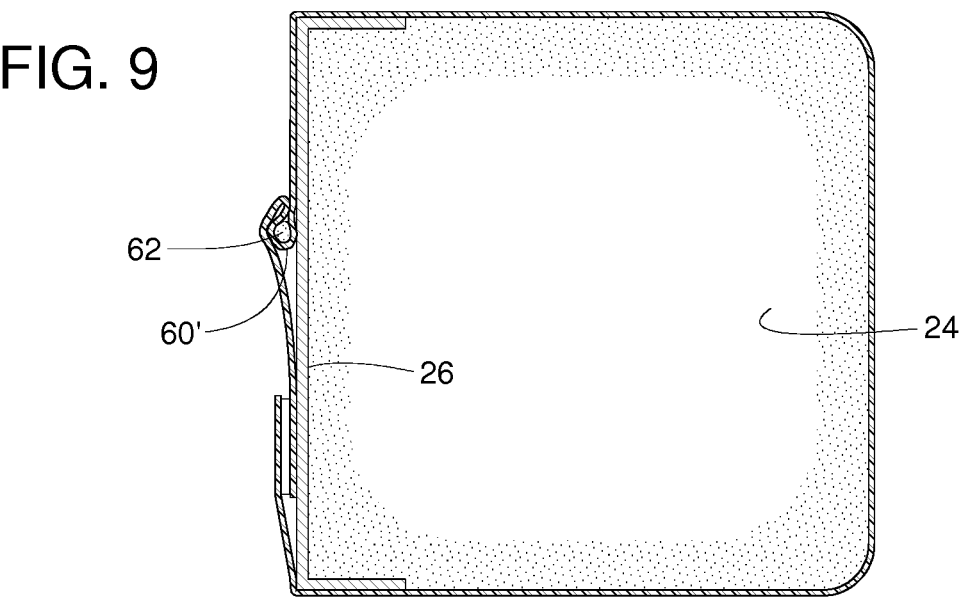
FIG. 9 is a cross-sectional view similar to FIG. 7 but showing yet another example side seal described herein.

Although lip 60 of FIG. 7 is shown as a hollow loop of material on the exterior surface of side seal 20", the loop created by lip 60 could be filled with a compressible foam core, and/or lip 60 could be situated between backer 26 and the exterior surface of cover 58. FIG. 9, for example, shows a loop-shaped lip 60' filled with a compressible foam core 62, whereby core 62 urges lip 60' to conform to an irregular surface of wall 18. For perhaps a neater appearance or ease of manufacturing, lip 60' of FIG. 9 is between backer 26 and the exterior surface of the side seal 20".

Figure 10:
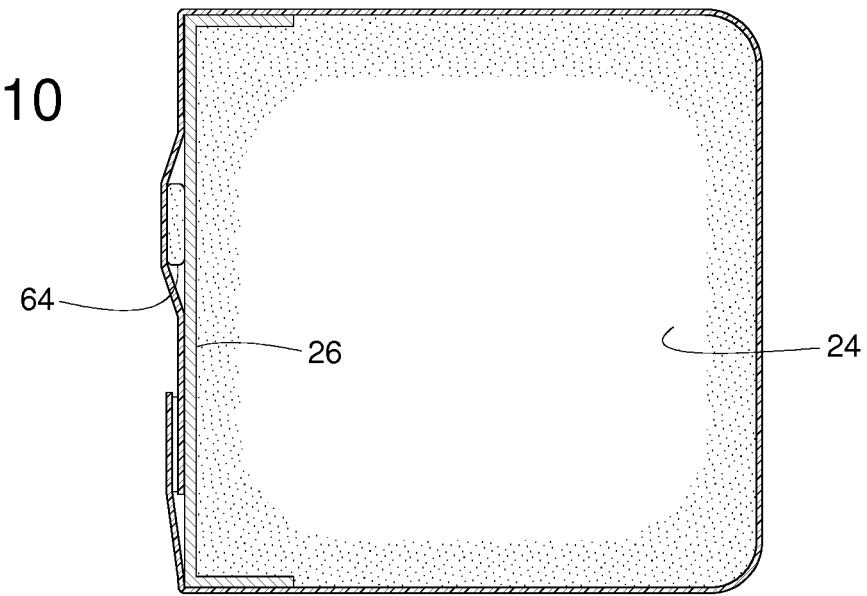
FIG. 10 is a cross-sectional view similar to FIGS. 3, 5, 7 and 9 but showing yet another example side seal described herein.

In yet another example, shown in FIG. 10, sealing between a side seal and wall 18 is achieved by installing a compressible foam insert 64 between backer 26 and a cover similar to cover 58. In this case, the bulge created by insert 64 being underneath the cover is referred to as a "lip" that can help seal gaps between a backer and a wall to which the backer is mounted. The bulge and resulting lip created by insert 64 can be narrow, as shown, or extend the full width of backer 26.

At least some of the aforementioned examples include one or more features and/or benefits including, but not limited to, the following:

In some examples, a pliable cover for a side seal of a loading dock includes a flexible protruding lip that helps seal a gap between the side seal and a wall to which the side seal is mounted.

In some examples, the protruding lip is sufficiently flexible and pliable to conform to an irregular surface of a wall.

In some examples, the protruding lip serves as a narrow cover under which caulk can be applied, thus much of the caulk is hidden between the lip and the wall.

In some examples, the protruding lip is positioned completely behind the side seal to make it easier to additionally caulk the side seal to the wall if necessary.

In some examples, the protruding lip is made from a combination of a back sheet and a side sheet.

In some examples, an interface between the side sheet and the back sheet is at a vertical corner of the side seal.

In some examples, an interface between the side sheet and the back sheet is located behind the side seal, i.e., between the back sheet and the wall.

In some examples, a side seal includes a touch-and-hold fastener and/or overlapping layers of material that are held in compression to seal a gap between a wall and the backside of the side seal.

In some examples, the back sheet of a side seal is comprised of two distinct pieces.

In some examples, the side sheet and the back sheet are two distinct pieces.

In some examples, the side sheet and the back sheet are an integral extension of each other.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A dock seal comprising:
a rigid backer to couple the dock seal to an exterior wall;
a resiliently compressible member supported by the backer; and
a pliable cover to encase the compressible member, the pliable cover having a first end overlapping a second end to define a separable joint engaging a side of the rigid backer opposite another side of the backer supporting the compressible member, and the separable joint to engage the exterior wall when the dock seal is coupled to the wall, the separable joint to reduce an air gap between the backer and the outside surface of the wall; and a plurality of attachment members to couple the rigid backer to the exterior wall such that the separable joint is positioned between the plurality of attachment members.

2. The dock seal of claim 1, wherein the first and second ends of the pliable cover are disposed between lateral sides of the dock seal.

3. The dock seal of claim 1, wherein the pliable cover comprises a unitary fabric sheet.

4. The dock seal of claim 1, further comprising a fastener to couple the first and second ends.

5. The dock seal of claim 4, wherein the fastener comprises a touch-and-hold fastener.

6. The dock seal of claim 4, wherein the first and second ends are to conform to irregularities in the wall and reduce a gap between the wall and the backer when the dock seal is coupled to the wall.

7. The dock seal of claim 1, wherein the separable joint is coupled via a touch-and-hold fastener.

8. The dock seal of claim 7, wherein the joint is disposed at approximately a midpoint between lateral sides of the dock seal.

9. The dock seal of claim 1, further comprising a seal disposed between the backer and the pliable cover adjacent the separable joint.

10. The dock seal of claim 1, wherein the pliable cover includes a first sheet to define the first end and a second sheet to define the second end.

11. A dock seal comprising:
a rigid backer having a back surface that is to face a wall when the backer is coupled to the wall;
a first bracket to couple a first side of the backer to the wall;
a second bracket spaced away from the first bracket to couple a second side of the backer to the wall;

a resiliently compressible member supported by the backer; and a pliable cover overlying the resiliently compressible member, the pliable cover having a front sheet to engage a vehicle, a back sheet to engage the wall, and first and second side sheets between the front sheet and the back sheet, the back sheet having a first portion and a second portion engaging a side of the rigid backer opposite another side of the backer supporting the compressible member, the first portion is to overlap at least a portion of the second portion, the first and second portions to engage the wall to reduce a gap between the wall and a surface of the backer positioned toward the wall when the dock seal is coupled to the wall, the overlapping first and second portions to be positioned between the first and second brackets.

12. The dock seal of claim 11, further comprising a fastener to couple the first portion and the second portion.

13. The dock seal of claim 11, wherein the first and second portions overlap to define a separable joint, wherein the separable joint is to compress to provide a seal between the wall and the backer when the backer is attached to the wall.

14. The dock seal of claim 13, wherein the separable joint includes a touch-and-hold fastener.

15. The dock seal of claim 13, wherein the back sheet comprises a first back sheet and a second back sheet, wherein the first back sheet overlaps the second back sheet to define the separable joint.

16. The dock seal of claim 15, wherein the first and second side sheets are integral with the front sheet, and wherein the first side sheet is coupled to the first back sheet via a first fastener and the second side sheet is coupled to the second back sheet via a second fastener.

17. A dock seal comprising:
a resiliently compressible member coupled to a rigid backer and having a back side to face a wall;
a plurality of brackets to couple the rigid backer to the wall;
a first pliable cover overlying a front side and lateral sides of the resiliently compressible member, the front side to engage a vehicle when the dock seal is coupled to the wall;
a second pliable cover overlying a first portion of the back side of the compressible member, a first end of the second pliable cover overlaps at least a portion of a first end of the first pliable cover, the first and second pliable covers engaging a side of the rigid backer opposite another side of the backer supporting the compressible member; and
a first fastener to couple the first ends of the first and second pliable covers, the first fastener and the first ends of the first and second pliable covers are to engage the wall to reduce an air gap between the wall and a surface of the backer oriented toward the wall when the dock seal is coupled to the wall, the fastener and the first ends to be positioned between the plurality of brackets.

18. The dock seal of claim 17, wherein a second end of the first pliable member overlaps at least a portion of a second end of the second pliable member.

19. The dock seal of claim 18, further comprising a second fastener to couple the second ends of the first and second pliable members, wherein the second fastener and the second ends of the first and second pliable members are to reduce the gap between the backer and the wall when the dock seal is coupled to the wall.

20. The dock seal of claim 19, wherein at least the first fastener or the second fastener is disposed between lateral sides of the compressible member and adjacent the back side of the compressible member.

* * * * *

UNITED STATES PATENT AND TRADEMARK OFFICE
CERTIFICATE OF CORRECTION

PATENT NO. : 8,495,838 B2
APPLICATION NO. : 13/231455
DATED : July 30, 2013
INVENTOR(S) : Digmann et al.

Page 1 of 1

It is certified that error appears in the above-identified patent and that said Letters Patent is hereby corrected as shown below:

In the Claims

Column 5, line 10 (claim 11), delete "is" between "portion" and "to".

Signed and Sealed this
Seventh Day of January, 2014

Margaret A. Focarino
*Commissioner for Patents of the United States Patent and Trademark Office*